(No Model.)

J. H. PITKIN & J. F. STEWARD.
MOWER.

No. 391,075. Patented Oct. 16, 1888.

Witnesses.
Arthur Johnson.
N. A. Kennedy.

Inventors,
J. H. Pitkin.
J. F. Steward.
By P. T. Dodge
Atty.

UNITED STATES PATENT OFFICE.

JULIAN H. PITKIN, OF LAKE VIEW, AND JOHN F. STEWARD, OF CHICAGO, ILLINOIS; SAID PITKIN ASSIGNOR TO WILLIAM DEERING, OF CHICAGO, ILLINOIS.

MOWER.

SPECIFICATION forming part of Letters Patent No. 391,075, dated October 16, 1888.

Application filed April 12, 1888. Serial No. 270,504. (No model.)

*To all whom it may concern:*

Be it known that we, JULIAN H. PITKIN and JOHN F. STEWARD, citizens of the United States, residing, respectively, at Lake View and at Chicago, both in the county of Cook and State of Illinois, have invented certain Improvements in Mowing-Machines, of which the following is a description, reference being had to the accompanying drawings, forming a part hereof.

Our invention relates to that familiar class of mowing-machines in which two hand-levers are employed on the main frame—one for lifting and the other for tilting or rocking the cutting mechanism. In machines ordinarily made these levers and attendant parts are so mounted on the frame that much time and labor are consumed in removing them to admit of the machine being housed or transported and again assembling the parts for operation.

The aim of our invention is to so mount the two levers and their latching or locking devices that said parts may be instantly removed from the frame without disconnecting them from each other. This construction saves both time and trouble, admits of said parts being shipped and stored in compact form, and permits them to be applied to the frame without the employment of skilled labor and without the possibility of having them improperly adjusted.

Figure 1:
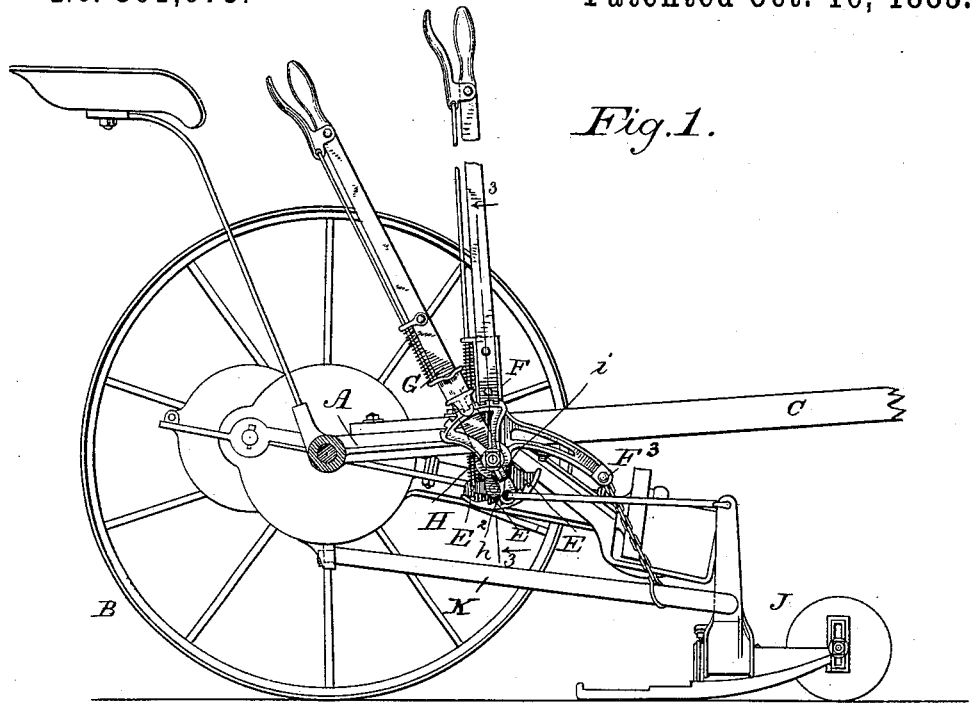
Figure 2:
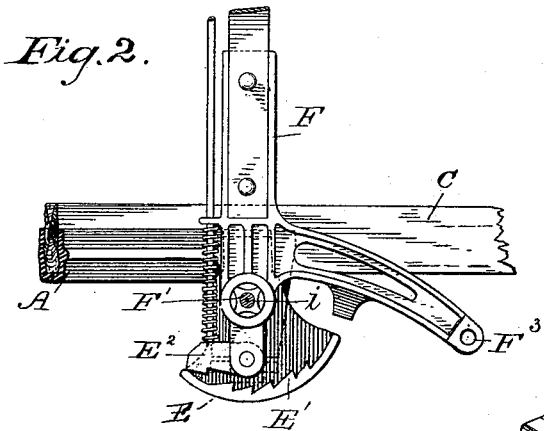
Figure 3:
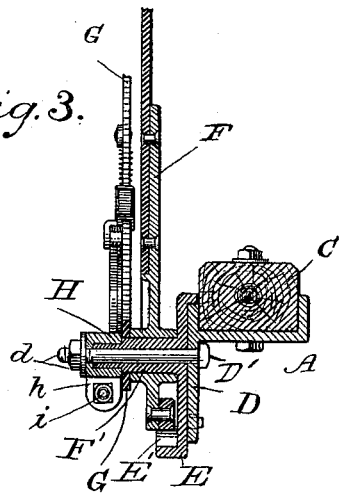
Figure 4:
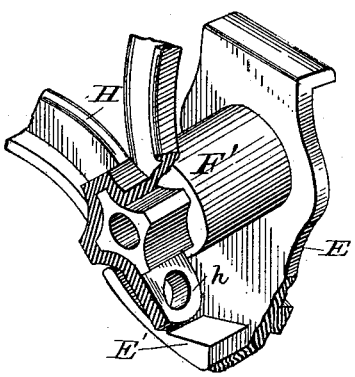

In the accompanying drawings, Figure 1 is a side elevation of a mower provided with our improvement. Fig. 2 is a side elevation showing the lifting-lever and its support connected to the frame, the tilting-lever and its attachments being removed. Fig. 3 is a vertical section on the lines 3 3 of Fig. 1. Fig. 4 is a perspective view of the lever-supporting plate, a portion of its lower end being broken away and a portion of the segment-plate for holding the tilting-lever shown in position thereon.

Referring to the drawings, A represents the main frame of the mower; B, one of its grain-wheels; C, the tongue, bolted at the rear end to a portion of the frame extending forward of the axle.

J represents the cutting mechanism connected to the forward end of the push-bar K and otherwise connected with the main frame in any ordinary manner, so that it may rise and fall, and that the cutter bar may be rolled or tilted forward and backward.

The foregoing parts may be in every particular of ordinary construction, and are not claimed as of our invention.

F represents an angular hand-lever, commonly known as the "lifting-lever," mounted on a horizontal pivot and connected by a chain, $F^3$, with the push-bar K, or other appropriate part of the cutting mechanism, for the purpose of lifting the same bodily.

G is a second hand-lever, also mounted on a horizontal pivot, and connected at its lower end by a rod with an arm rising from the cutting mechanism for the purpose of tilting or lowering the same. The connection of the two levers with the cutting mechanism and their action thereon may be the same as in ordinary machines.

In applying our invention, which relates solely to the lever supporting and locking devices, we provide the main frame with a vertical flange or plate, D, of the form shown in Fig. 3, or similar form adapted to receive or sustain the lever-supporting plate E. This plate E is formed with a horizontal journal or trunnion. It is adapted to fit against the outer face of the plate D, and is provided at the upper edge with a shoulder to rest upon said plate, as shown in Figs. 3 and 4, or similarly formed to engage therewith. At its lower edge the plate E is provided with a curved or segmental flange, E', having in its upper face ratchet-teeth, as shown in the several figures. The lifting-lever F is mounted loosely upon and around the trunnion, and provided at its lower ends with a dog or latch, $E^2$, adapted to engage in the teeth E', whereby the lever may be locked in position. The latch is provided with a rod or other customary operating device extending to the upper end of the handle. The tilting-lever G is also mounted on the journal F outside of the lifting-lever and is wholly independent thereof.

The extreme outer end of the journal F' is of angular form, as shown in Fig. 4, and gives support to the toothed segment-plate H, fitted firmly thereon. This plate interlocking with the customary latch or dog on the tilting-lever G holds the latter in its adjusted position.

The segment-plate H is split or divided at the lower end and provided with a transverse bolt, $i$, by which it is contracted tightly upon the angular end of the journal, so that it is held rigidly in place thereon. This plate thus applied also serves to hold the two levers upon the journal.

Through the journal F', from end to end, we form a hole to receive a fastening-bolt, D', which is passed therethrough and through the main frame and provided with a nut, $d$, on one end, the bolt thus applied serving to hold the plate E, both levers, and the segment-plates in place on the main frame. By simply removing the bolt the plate E, with the levers, is released, so that it may be instantly removed.

Having thus described our invention, what we claim is—

1. In a mowing-machine, the main frame having the forward arm or extension, D, and the cutting mechanism, as usual, in combination with the plate E, detachably bolted to said arm and provided with the trunnion and two rack-plates, and the lifting-lever and the tilting-lever, both mounted on said trunnion and provided with the latching devices.

2. In combination with the mower-frame, the detachable plate E, provided with teeth E' and journal F', the two levers mounted independently on said journal, and the segment-plate H, fixed on the end of the journal, as shown.

3. The plate having teeth E' and rigid journal F', in combination with the two levers mounted on said journal and provided with latches, the divided toothed plate H, encircling the journal, and the bolt $i$, applied to contract the plate.

4. In combination with the mower main frame, the plate E, provided with teeth E' and trunnion F, in combination with two levers on the trunnion, the plate H, and the fastening-bolt passed axially through the trunnion and through the frame.

JULIAN H. PITKIN.
JOHN F. STEWARD.

Witnesses:
JOHN B. KASPARI,
ARTHUR JOHNSON.